United States Patent [19]
Nielsen et al.

[11] Patent Number: 5,963,950
[45] Date of Patent: Oct. 5, 1999

[54] METHOD AND SYSTEM FOR FACILITATING ACCESS TO SELECTABLE ELEMENTS ON A GRAPHICAL USER INTERFACE

[75] Inventors: Jakob Nielsen, Atherton; Earl Johnson, San Jose; Donald R. Gentner, Palo Alto, all of Calif.

[73] Assignee: Sun Microsystems, Inc., Palo Alto, Calif.

[21] Appl. No.: 08/670,952

[22] Filed: Jun. 26, 1996

[51] Int. Cl.⁶ ..................................................... G06F 17/30
[52] U.S. Cl. .............................. 707/102; 707/2; 707/500; 707/104
[58] Field of Search ..................................... 707/500, 104, 707/102, 2; 345/333; 395/200.47

[56] References Cited

U.S. PATENT DOCUMENTS

| | | | |
|---|---|---|---|
| 5,263,174 | 11/1993 | Layman | 345/800 |
| 5,297,249 | 3/1994 | Berstein | 345/356 |
| 5,339,392 | 8/1994 | Risberg | 345/338 |
| 5,572,643 | 11/1996 | Judson | 395/200.48 |
| 5,603,025 | 2/1997 | Tabb | 707/2 |
| 5,621,871 | 4/1997 | Jaremko | 345/441 |
| 5,659,729 | 8/1997 | Nielsen | 707/3 |
| 5,692,073 | 11/1997 | Cass | 382/219 |
| 5,708,825 | 1/1998 | Sotomayor | 1/1 |
| 5,787,416 | 7/1998 | Tabb | 707/2 |
| 5,806,077 | 9/1998 | Wecker | 707/501 |
| 5,877,766 | 3/1999 | Bates | 345/357 |

FOREIGN PATENT DOCUMENTS

| | | |
|---|---|---|
| 0 328 831 A2 | 8/1989 | European Pat. Off. . |
| 0 428 261 A2 | 5/1991 | European Pat. Off. . |
| 94/17469 | 8/1994 | WIPO . |

OTHER PUBLICATIONS

"Multi–Character H–To–Hawaii Search Capability", IBM Technical Disclosure Bulletin, vol. 37, No. 12, Dec. 1994, pp. 285–286, XP000487787.

Jon Gunderson, Ph.D., "World Wide Web Browser Access Recommendations", University of Illinois at Urbana/Champaign, no date.

*Primary Examiner*—Thomas G. Black
*Assistant Examiner*—Diane D. Mizrahi
*Attorney, Agent, or Firm*—McDermott, Will & Emery

[57] ABSTRACT

In one embodiment the present invention provides a method of selecting a selectable element with a character input device from a list of exically unordered selectable elements on a graphical user interface (GUI). Typically, these selectable elements include hypertext links and GUI buttons on the GUI of computer program executing on a computer system. Each selectable element includes a character portion of data which facilitates selecting the selectable element. The method typically begins the selection process when a user enters one or more characters from a character input device. In response to receiving the characters, the present invention inserts each character into a match string. The match string is then compared with the character portion of each selectable element on the GUI. A selectable element is "armed" when the character portion of a selectable element is found which matches the match string. Arming a selectable element prepares the element for selection and typically involves highlighting, underlining or otherwise distinguishing the hypertext link from other text on a page. The user can then select the armed selectable element by actuating the "enter" key. If a hypertext selectable element is selected then the information associated with a destination node (e.g., a web page) is displayed for the user. Instead of selecting the armed selectable element, the user may search for a different selectable element by entering additional characters and not actuating the "enter" key. The method disclosed provides an improved selection method over prior methods because a user can quickly search and select a selectable element by typing a minimum number of characters.

26 Claims, 11 Drawing Sheets

This is a first entry[1]

This is a second entry[2]

This is a third entry[3]

This is a fourth entry[4]

Prior Art CERN Interface

Figure 1

This is a first entry

This is a second entry

This is a third entry

This is a fourth entry

*Prior Art* LYNX Interface

Figure 2

METHOD AND SYSTEM FOR FACILITATING ACCESS TO SELECTABLE ELEMENTS ON A GRAPHICAL USER INTERFACE

FIELD OF THE INVENTION

The present invention generally relates to graphical user interfaces (GUI) used on computer systems and, more specifically, to techniques for accessing the selectable elements in a GUI without a pointing device.

BACKGROUND OF THE INVENTION

Most computer programs executed on a computer system are controlled with a graphical user interface (GUI). The GUI displays selectable elements such as hypertext links and GUI buttons on a display device for the user to view and select. Typically, the user must use a pointing device, such as a mouse or trackball, to select the selectable elements provided by the GUI. Unfortunately, users who do not use a pointing device may be unable to use GUI based computer programs. For example, some users may have permanent physical disabilities or repetitive motion diseases, such as carpal tunnel syndrome, which prevents them from using a mouse or other pointing device. In other cases, the user may not want to use a pointing device in order to minimize the homing time associated with moving from the keyboard to the pointing device and back. It also may be necessary to eliminate the mouse from a computer system to reduce costs. In each case, these users would have great difficulty controlling a computer program which has a GUI interface. For these reasons, there is a need to access the selectable elements of a GUI without a pointing device.

Numerous conventional methods developed for selecting selectable elements on a GUI without a mouse or pointing device do not optimize a user's input speed. These methods were developed when the number of selectable elements in a given system were small and the information relatively ordered. In contrast, increasingly popular hypertext systems such as the World Wide Web (WWW) have hundreds of selectable hypertext links which are lexically unordered. As pointed out below, these conventional systems do not provide an efficient and easy method of accessing these hypertext systems without a pointing device.

FIG. 1 illustrates the technique developed by CERN for accessing a hypertext link without a pointing device. In this system, a number is assigned to each hypertext link and then added to the hypertext link text displayed to the user. A user can select a particular hypertext link by entering the hypertext link number on a keyboard device. Actuating the "enter" key takes the user to the information (e.g., a "web" page) associated with the selected hypertext link.

Unfortunately, the CERN method of accessing hypertext links is aesthetically unappealing. Adding numbers to each hypertext link changes the layout and appearance of the hypertext and impairs the designers ability to control the presentation of information on a screen. This tends to clutter the interface with unnecessary information and thus reduce the overall ease of use for the user. Furthermore, the numbers added to each hypertext link take up space which could be used to store and display additional meaningful information rather than control information used to select the hypertext link.

The CERN system is also not advantageous on a system with a large number of hypertext links. In the CERN system a user can only view and select a link being displayed on the screen. Therefore, to view the additional links a user must scroll through numerous additional screens. Searching through a large number of hypertext links in this manner is both tedious and inefficient. For example, consider a web page on the WWW which contains a list of all companies incorporated in the United States separated by each state. Many of the companies will have several entries on the web page because they are incorporated in several different states. A user may take hours to find the place of incorporation for a particular company because he or she must scroll though multiple screens of information. Furthermore, the user will have no simple method of determining if multiple entries in the hypertext system exist for a particular company. The CERN system will not indicate if multiple occurrences of a hypertext link appear on the same web page. Thus, the user may have a difficulty determining if the company has been incorporated in multiple states.

The LYNX system is another method for accessing hyperlink information without using a pointing device. The LYNX system is shown in FIG. 2. In the LYNX system a user must move sequentially through each hypertext link using a cursor key. A user actuates the "enter" key to select the hypertext link indicated by the cursor.

The LYNX approach solves some problems found in the CERN interface and introduces additional problems of its own. The LYNX technique is an improvement over the CERN interface because no additional text must be placed in the hypertext links. However, the LYNX approach remains undesirable because it requires numerous keystrokes to locate a specific hypertext link. On a large hypertext system, the excessive number of keystrokes may deter the user from using the system. For example, assume the previously mentioned web page contained a list of approximately 1,000 companies. On the average, the LYNX system could require up to 500 keystrokes to locate a hypertext link for a particular company. This is clearly an inefficient technique for accessing hypertext or GUI system buttons without a pointing device.

The present invention provides an elegant method for selecting selectable elements on a GUI without a pointing device. The present invention is particularly well suited for hypertext systems with a large number of hypertext links such as the World Wide Web(WWW).

SUMMARY OF THE INVENTION

In one embodiment, the present invention provides a method of selecting a selectable element from a list of selectable elements on a graphical user interface (GUI) with a character based input device. The selectable element is defined as any portion of the GUI responsive to the input signals from a pointing device or a character based input device. Typically, the selectable elements include hypertext and GUI buttons on the GUI of a computer program executing on a computer. In one embodiment, the selectable element includes a character portion of data which facilitates selecting the selectable element.

In one embodiment, the method begins the selection process upon receipt of one or more characters from a character based input device. In response to receiving the characters, the method inserts each character into a match string. The match string is then compared with the character portion of at least one selectable element on the GUI. A selectable element is "armed" when a character portion of a selectable element is found which matches the match string. Arming a selectable element prepares the element for selection and typically involves highlighting, underlining or otherwise distinguishing the hypertext link from other text on a page. The method selects the armed selectable element upon receipt of an "enter" key or an equivalent input signal from a character based input device. If a selectable element is selected then the information associated with a destination node (e.g., a web page) is displayed on a display device. Instead of selecting the armed selectable element, the method may search for a different selectable element upon receipt of additional characters from a character based input device. This particular embodiment provides an improved selection method over prior methods because it requires a minimum number of characters to quickly search and select a selectable element on a GUI.

In another embodiment, a match string timer is used to remove all the characters from the match string after a predetermined time has elapsed and the user has provided no input. This predetermined time interval begins when a user enters a first character. In one embodiment, the match string timer is loaded with a predetermined timeout value each time the method receives a new character. The match string timer begins counting down immediately after detecting the new character. If the match string timer does not count down to zero before a subsequent character is entered, the additional character is appended to the match string. However, if the match string timer counts down to zero before a subsequent character is received, the characters in the match string are removed and a subsequently entered character is inserted into an empty match string. In one embodiment, the predetermined time period is user defined and can be adjusted from one or more milliseconds up to one or more seconds of time. The match string timer allows the user to make a new search by pausing a few moments between keystrokes.

In yet another embodiment, a current location marker is used to alter the order in which one or more selectable elements are matched with the match string. Initially, the current location marker is set to the first selectable element in a list of selectable elements in the GUI. The match string is first compared with the selectable element indicated by the current location marker. If the comparison produces a match, the selectable element is armed and the current location marker is advanced to the next selectable element immediately subsequent to the armed selectable element. If the comparison does not produce a match, the current location marker is advanced to the next selectable element in preparation for another comparison. In one embodiment, the current location marker is advanced until a match is found or comparisons are made with all the selectable elements. The current location marker facilitates multiple searches on a GUI having a large number of selectable elements. Moreover, each search by the present method will begin with the last selectable element that was armed.

The present invention is faster and more powerful than the prior art because it requires a minimum number of characters to quickly search and select a selectable element on a GUI.

Notations and Nomenclature

The detailed descriptions which follow are presented largely in terms of methods and symbolic representations of operations on data bits within a computer. These method descriptions and representations are the means used by those skilled in the data processing arts to most effectively convey the substance of their work to others skilled in the art.

A method is here, and generally, conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be bourne in mind, however, that all of these and similar terms are to be associated with the appropriate physical quantities and are merely convenient labels applied to these quantities.

Useful machines for performing the operations of the present invention include general purpose digital computers or similar devices. The general purpose computer may be selectively activated or reconfigured by a computer program stored in the computer. A special purpose computer may also be used to perform the operations of the present invention. In short, use of the methods described and suggested herein is not limited to a particular computer configuration.

BRIEF DESCRIPTION OF THE DRAWINGS

FIG. 1 illustrates a previously used technique developed by CERN for accessing a hypertext link without a pointing device.

FIG. 2 illustrates the existing LYNX technique for accessing a hypertext link without a pointing device.

DETAILED DESCRIPTION

Figure 3:
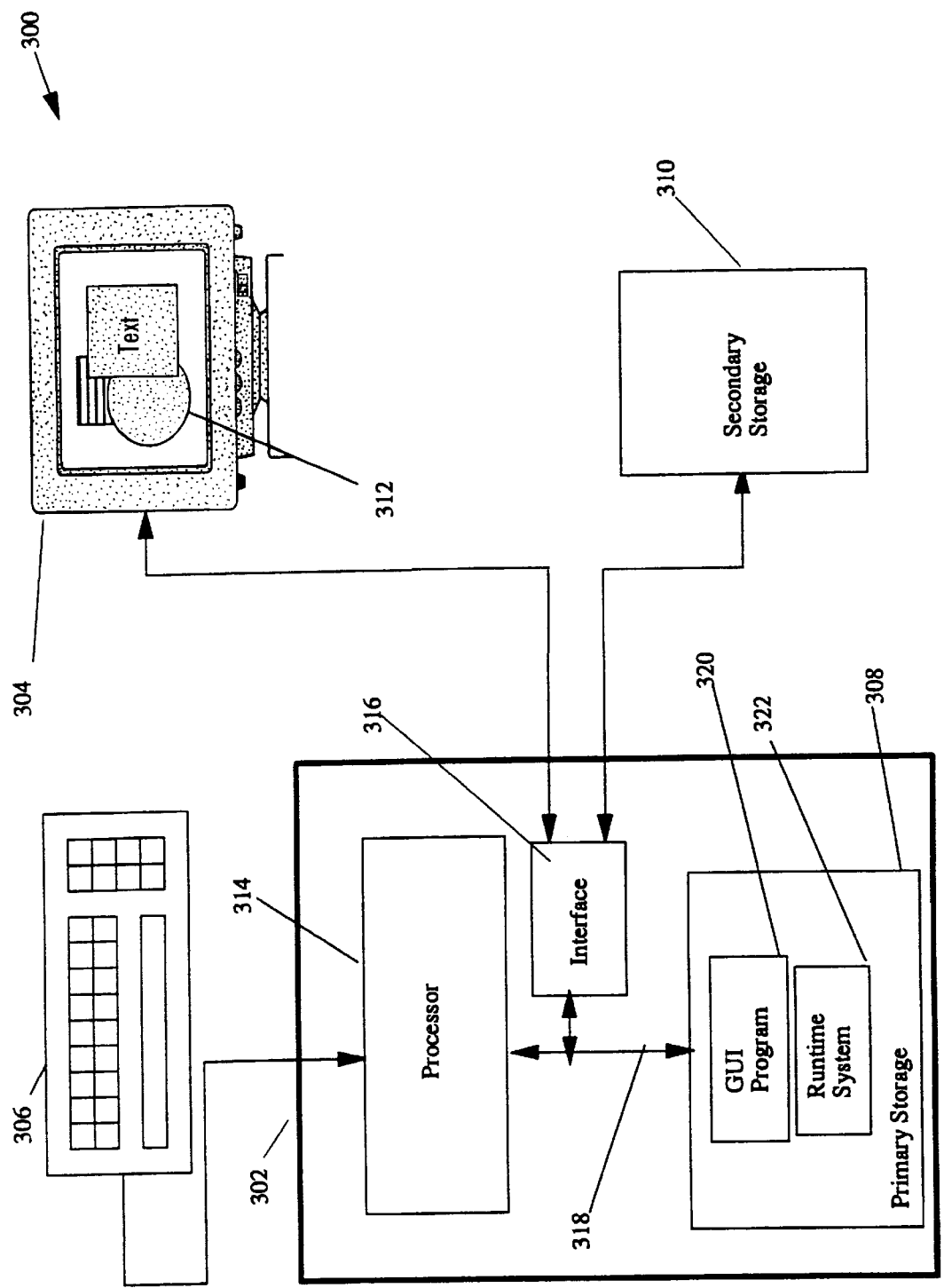
FIG. 3 is a block diagram of a computer system which provides an environment for practicing one embodiment of the present invention.

Overview of an Embodiment of the Invention

In one embodiment, the present invention provides a method of selecting a selectable element from a large number of selectable elements on a graphical user interface (GUI) without a pointing device. The selectable element is defined as any portion of the GUI responsive to the input signals from a pointing device or a character based input device. Typically, these selectable elements include hypertext and GUI buttons on the GUI of a computer program executing on a computer. On most large network based systems, such as the World Wide Web (WWW), the selectable elements are not sorted lexically by title or topically according to their subject matter. Instead, data on the large network based systems remains unsorted. This vast amount of unsorted data makes accessing specific selectable elements especially difficult. The present embodiment provides an improved selection method over prior methods because it requires a minimum number of characters to quickly search and select a selectable element on a GUI.

In one embodiment the method begins the selection process upon receipt of one or more characters from a character based input device. In response to receiving the characters, the method inserts each character into a match string. The match string is then matched with the character portion of each selectable element on the GUI. A selectable element is "armed" when a character portion of a selectable element is found which matches the match string. Aiming a selectable element prepares the element for selection and typically involves highlighting, underlining or otherwise distinguishing the hypertext link from other text on a page. The method selects the armed selectable element upon receipt of an "enter" key or an equivalent input signal from a character based input device. If a selectable element is selected then the information associated with a destination node (e.g., a web page) is displayed on a display device. Instead of selecting the armed selectable element, the method may search for a different selectable element upon receipt of additional characters from a character based input device.

In another embodiment, a match string timer is used to remove all the characters from the match string after a predetermined time has elapsed and the user has provided no input. This predetermined time interval begins when a user enters a first character. In one embodiment, the match string timer is loaded with a predetermined timeout value each time the method receives a new character. The match string timer begins counting down immediately after detecting the new character. If the match string timer does not count down to zero before a subsequent character is entered, the additional character is appended to the match string. However, if the match string timer counts down to zero before a subsequent character is received, the characters in the match string are removed and a subsequently entered character is inserted into an empty match string. In one embodiment, the predetermined time period is user defined and can be adjusted from one or more milliseconds up to one or more seconds of time. The match string timer allows the user to make a new search by pausing a few moments between keystrokes.

In yet another embodiment, a current location marker is used to alter the order in which one or more selectable elements are matched with the match string. Initially, the current location marker is set to the first selectable element in a list of selectable elements in the GUI. The match string is first compared with the selectable element indicated by the current location marker. If the comparison produces a match, the selectable element is armed and the current location marker is advanced to the next selectable element immediately subsequent to the armed selectable element. If the comparison does not produce a match, the current location marker is advanced to the next selectable element in preparation for another comparison. In one embodiment, the current location marker is advanced until a match is found or comparisons are made with all the selectable elements. The current location marker facilitates multiple searches on a GUI having a large number of selectable elements. Moreover, each search using this one embodiment will begin with the last selectable element that was armed.

Embodiments of the present invention are faster and more powerful than the prior art because they require a minimum number of characters to quickly search and select a selectable element on a GUI.

Overview of One Embodiment

FIG. 3 is a block diagram of a computer system 300 which illustrates a computer system for practicing various embodiments of the present invention. Typically, a computer system 300 includes a computer 302, a display device 304, an input device 306 such as a keyboard, a primary storage device 308 and a secondary storage device 310. The display device 304 displays a graphical user interface (GUI) 312 for facilitating the display of graphics and text for the user using the system 300. Display devices 304 include, for example, printers and computer display screens such as cathode ray tubes (CRT's), light-emitting diode (LED) displays, and liquid crystal displays (LCD's). Input devices 306 can include, without limitation, electronic keyboards and pointing devices such as electronic mice, trackballs, lightpens, thumbwheels, digitizing tablets, and touch sensitive pads.

The computer 302 includes a processor 314 which fetches computer instructions from a primary storage 308 through an interface 316, such as an input/output subsystem, connected to a bus 318. Computer 302 can be, but is not limited to, any of the SPARCstation or Ultra workstation computer systems available from Sun Microsystems, Inc. of Mountain View, Calif., any other Macintosh computer systems based on the PowerPC processor and available from Apple Computer, Inc. of Cupertino, Calif., or any computer system compatible with the IBM PC computer systems available from International Business Machines, Corp of Somers, N.Y. which are based upon the X86 series of processors available from the Intel Corporation or compatible processors.[1] Processor 314 executes these fetched computer instructions. The processor 314 can be, but is not limited to, any of the SPARC processors available from Sun Microsystems, Inc. of Mountain View, Calif. or any processors compatible therewith. Executing these computer instructions enables the processor 314 to retrieve data or write data to the primary storage 308, display information on one or more computer display devices 304, receive command signals from one or more input devices 306, or transfer data to secondary storage 310 or even other computer system which collectively form a computer network (not shown). Those skilled in the art understand that primary storage 308 and secondary storage 310 can include any type of computer storage including, without limitation, randomly accessible memory (RAM), read-only-memory (ROM), application specific integrated circuits (ASIC) and storage devices which include magnetic and optical storage media such as CD-ROM.

1. Sun, Sun Microsystems, the Sun logo, SPARC, and Ultra are trademarks or registered trademarks of Sun Microsystems, Inc. in the United States or other countries.

The primary storage 308 stores a number of items including a GUI program 320 and an runtime environment 322. The runtime environment 322 typically is an operating system which manages computer resources, such as memory, disk or processor time, required for the present invention to run. The runtime environment 322 may also be a microkernel, a message passing system, one or more dynamic loadable linkable modules, a browser application for the World Wide Web, a runtime interpreter environment, or any other system which manages computer resources.

The World Wide Web

The exemplary embodiment described below in accordance with FIGS. 5–11 selects selectable elements, such as hypertext links, on the World Wide Web (WWW) without a pointer device. As such, it is useful to understand how the WWW is constructed and how one embodiment of the present invention could be used to select a selectable element on the WWW.

Figure 4:
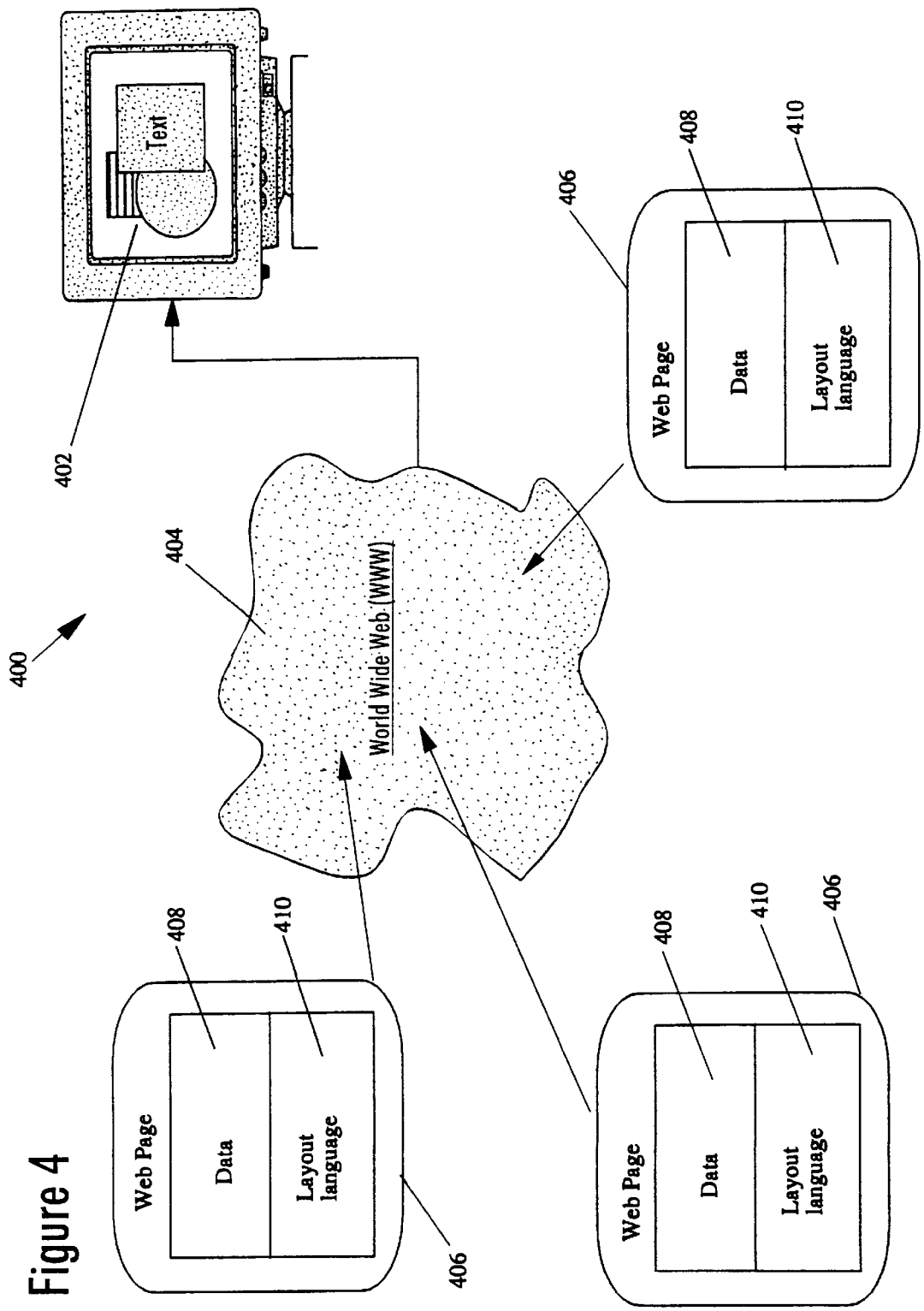
FIG. 4, illustrates a GUI system designed to display information from the World Wide Web (WWW).

FIG. 4 illustrates a typical GUI based system 400 designed to display information located on the WWW 404. The WWW 404 is a warehouse for millions and millions of bytes of data contained in discrete storage elements called web pages. A web page 406 contains data 408 and a layout language 410 which describes how the data should be displayed. The layout language 410 used within each web page, for example, includes any combination of Java™, JavaScript™, VRML, hypertext markup language (HTML) or any other language which supports hypertext functionality.[1] The user views a web page from the World Wide Web using a particular type of GUI program called a browser. A browser 402 accepts the data 408 and the layout language 410 and in response produces a graphical image containing hypertext links along with text, graphics and various other types of multimedia.

1. Sun, Sun Microsystems, the Sun logo, Java, and Javascript are trademarks or registered trademarks of Sun Microsystems, Inc. in the United States or other countries.

The hypertext links are of particular importance because they facilitate access to web pages located all over the WWW. An anchor tag in HTML is used to define a hypertext link on the WWW. The anchor tag has a destination portion and a text portion. Furthermore, the anchor tag is delimited at the beginning by a "<A>" and at the end by a "<A>" character sequence. The destination portion contains an entry which indicates the location of the destination web page. The text portion is the text which appears on the GUI and is associated with the hypertext link. For example, consider a hypertext link having the following HTML anchor tag:

<A HREF=http://sunweb.ebay/sunweb/orgs>Sun Microsystems</A>

The destination portion of this tag is "http://sunweb.ebay/sunweb/orgs." The text "Sun Microsystems" occupies the text portion of this HTML based hypertext link. In an exemplary embodiment, the text portion of the anchor tag is utilized by the present invention, as described in detail later herein, to facilitate searching and selecting hypertext links on the WWW without a pointing device.

The present invention is not limited for use with GUI systems designed for the WWW. One skilled in the art could apply the teachings and suggestions of the present invention to any GUI system which has text associated with selectable elements. Essentially, selectable elements includes all portions of the GUI which are responsive to the input signals from a pointing device or a character based input device.

Exemplary Steps of One Embodiment

FIGS. 5–11 illustrates one method for practicing the present invention. The flow diagrams described herein broadly illustrate the logical flow of steps to perform one embodiment of the present invention. Accordingly, numerous steps may be added to, or taken away from the flow diagrams, without departing from the scope of the invention. Furthermore, the order of execution of the steps in the flow diagrams may be changed without departing from the scope of the invention. Additional considerations in implementing the method described by the flow diagrams may also dictate changes in the selection and order of the steps.

Figure 5:
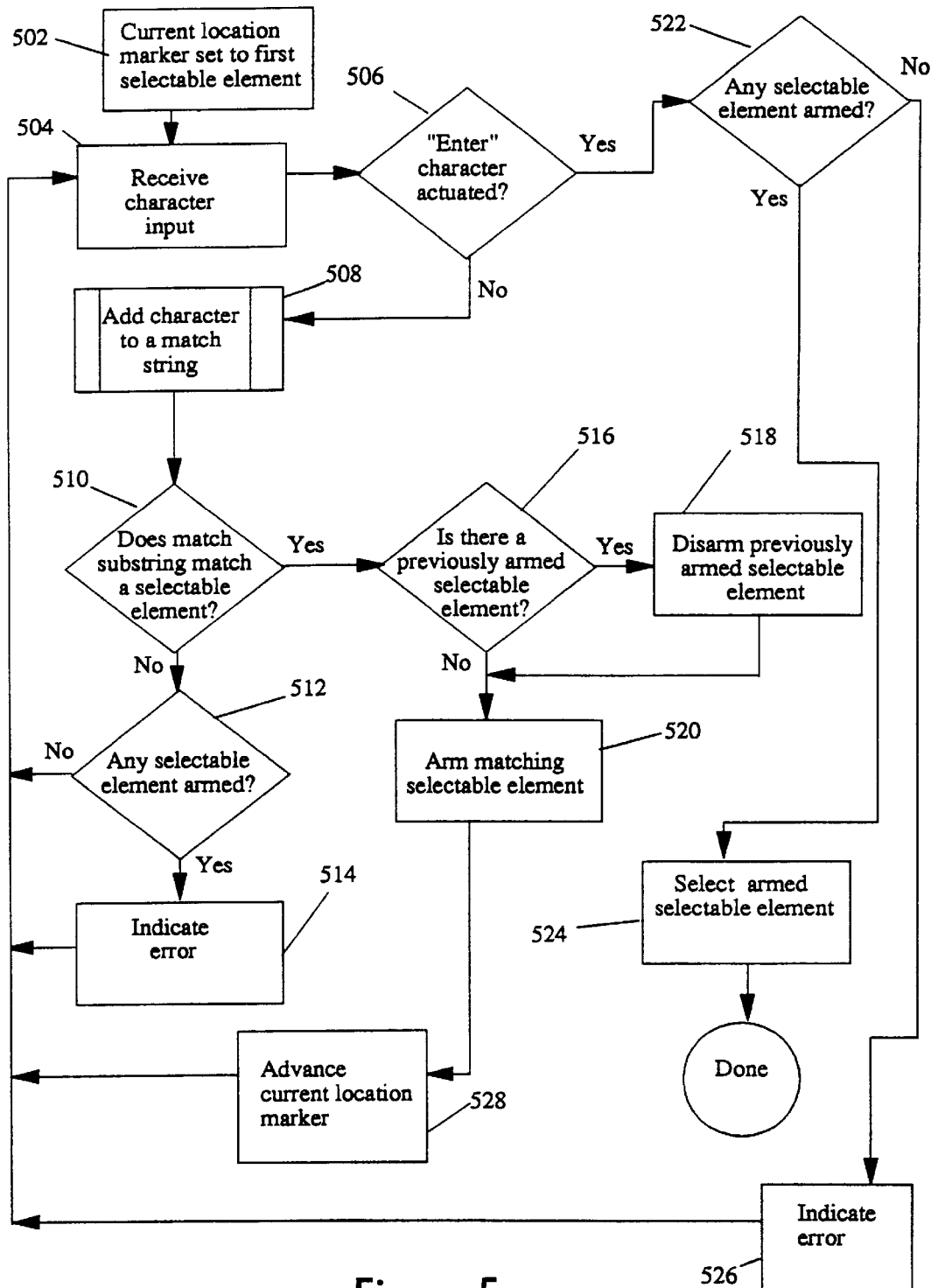
FIG. 5 is a flow diagram that provides an overview of the processing that takes place when one embodiment is used to select various selectable elements without a pointing device or mouse.

FIG. 5 is a flow diagram that provides an overview of the processing that takes place in the GUI 402 when an embodiment of the present invention is used to select various selectable elements without a pointing device or mouse. Before processing begins, the present embodiment initially requires a list of selectable elements to select from. Typically, a list of selectable elements is generated from data provided by an underlying application using the GUI program. For example, on the World Wide Web (WWW) a web page contains a list of anchor tags which describe hypertext links in HTML. A browser processes these anchor tags and displays corresponding hypertext links to the user on a display device. This embodiment receives the text portion of these anchor tags and creates a selectable element list for further processing described below.

Generally, selecting a selectable element requires several steps. First, the user indicates to the method which selectable element should be armed by actuating one or more characters with a character based input device. The method then highlights the armed selectable element in preparation for selection by the user. Next, the user actuates a selection character, such as an "enter" key, indicating that the armed selectable element should be selected. In response to receiving the selection character, the method selects the armed selectable element. Generally, selecting a selectable element causes the functionality associated with the selectable element to be performed (i.e. retrieving a "web" page).

Figure 8:
FIG. 8 illustrates which hypertext link is highlighted on a web page from the World Wide Web when a user enters the character "S" from a keyboard device.
Figure 9:
FIG. 9 illustrates which hypertext link is highlighted on a web page from the World Wide Web when a user enters the character "S" from a keyboard device at two separate instances.

In one embodiment, selecting the selectable element follows the steps 502–528 in FIG. 5. At step 502, the current location marker is set to the first selectable element in the selectable element list the first time the invention is used. The current location marker indicates which selectable element should be compared first in the matching process described below. For example, FIG. 8 shows a web page displayed on a browser containing several hypertext links as indicated by the underlined text. In an exemplary embodiment, the current location marker in FIG. 8 is initially set to the first hypertext link 802 indicated by the characters "Sun Microsystems".

At step 504 the method receives a character on a character based input device such as a keyboard. In step 506, the method analyzes the character and determines if the character received was an "enter" key. In general, the "enter" key represents any input signal which indicates that a selectable element should be selected. If the method receives the "enter" key, the selectable element is selected as described in detail below. At step 508, the method adds the character to a match string. The match string holds a set of characters entered by the user for use in the matching step 510.

At step 510 character comparison techniques well known in the art are used to compare the match string with one or more selectable elements. In one embodiment, a sequence of one or more characters in the match string is compared to a sequence of one or more characters associated with one or more selectable elements. The method begins the comparisons starting with the selectable element indicated by the current location marker.

Steps 516–520 prevent two selectable elements from being armed simultaneously. Initially, a selectable element may be armed from a previous attempt to select a selectable element. This occurs when the method arms a selectable element without subsequently selecting it. At step 516, the method detects if there is a previously armed selectable element and a new selectable element is about to be armed. In one embodiment, if a selectable element was armed from a previous matching step, the method will disarm the previously armed selectable element at step 518 before the new matching selectable element is armed at step 520. If no selectable element was previously armed, the method will bypass step 518 and arm the matching selectable element at step 520 directly. Generally, the selectable element is armed when the matching step determines the characters within the match string match the text portion of the selectable element. Arming a selectable element includes highlighting, underlining or otherwise distinguishing the text of the selectable element from other text within the current page being displayed to the user.

Figure 10:
FIG. 10 illustrates which hypertext link is highlighted on a web page from the World Wide Web when a user enters the characters "St" from a keyboard device.

FIG. 8 and FIG. 10 will be used to illustrate how a previously armed selectable element is disarmed before a new selectable element is armed. Assume a user has entered the character "S" with a keyboard device and caused the hypertext link 802 to become armed. At this point, the current location marker is pointing to the hypertext link immediately subsequent to hypertext link 802. Before selecting hypertext 802, however, the user then enters the letter "t" using the keyboard. The method adds the letter "t" to the match string (step 508) and proceeds to compare the match string with the subsequent selectable elements starting with the current location marker. The method indicates a match between the match string and a hypertext link 1002 (step 510). As a result, step 518 disarms hypertext link 802 in FIG. 8 containing the text "Sun Microsystems" and arms the hypertext link 1002 in FIG. 10 containing the text "Starfire". In this way, only one selectable element is armed at any given moment and the user is not distracted by having multiple selectable elements to choose from. Also, the previously armed selectable element remains visibly armed on the display unit up until a new selectable element is armed.

Referring back to FIG. 5, at step 528 the current location marker is advanced to the first selectable element subsequent to the matching selectable element. This causes the next search to occur subsequent to the matching selectable element. For example, in FIG. 8 the current location marker is initially set to a hypertext link 802 because it is the first selectable element on the web page. Assume the method receives the letter "S" from a character based input device. The method receives the letter "S" and places it in the match string (step 508). Next, the matching step compares the "S" in the match string with the character portion of one or more hypertext link in the current web page until a match is found (step 510). In this case, the matching step 510 arms the hypertext link 802 in FIG. 8 because the character "S" in the match string matches the character "S" in "Sun Microsystems". Moreover, the method advances the current location marker to the first selectable element subsequent to the hypertext link 802 (e.g. the hypertext link containing the text "SunSoft"). Now assume the user removes the letter "S" from the match string by typing a backspace and then enters a new letter "S" into the match string. In this case, the method arms hypertext link 902 in FIG. 9, in a manner described above, because the hypertext link 902 pointed to by the current location marker matches the match string.

In some cases, the method will receive a sequence of characters from a character based input device which do not match any selectable element in the GUI. The user entering these characters may be searching for selectable elements which do not exist on the particular GUI being displayed. This portion of the invention handles the case where no selectable element matches the characters in the match string. Referring back to FIG. 5, at step 510 the method determines if the characters in the string do not match a selectable element. In one embodiment, if the selectable element has already been armed (step 512) the method will indicate an error (step 514). Those of ordinary skill will understand that the error indication provided by the method includes audio feedback, visual feedback or any other feedback capable of indicating an error to the user. The error indicates that the additional characters received by the method do not match another selectable element on the GUI. Consequently, the method may already have armed the selectable element which most closely matches the characters in the match string. In contrast, if no selectable element has been armed the method will return to step 504 to receive additional characters from the user and will not make an error indication. In this case, the method has not found a selectable element which matches the characters in the match string.

After steps 512, 514, or 528, the method returns to step 504 to receive an additional character input from the user. This portion of the processing determines whether a selectable element should be armed or the armed selectable element should be selected. At step 506, if an additional character, other than the "enter" key or an equivalent input signal, is provided, the method will add the character to the match string (step 508) and arm a selectable element in accordance with steps 510–528. Alternatively at step 506, if the method receives the "enter" key, or an equivalent input signal which indicates that a selectable element should be selected, the method first determines if a selectable element is currently armed (step 522). If a selectable element is currently armed (step 522), the method selects the armed selectable element (step 524). When the method selects the selectable element (step 524), the functionality associated with the selectable element is performed. For example, FIG. 8 illustrates a previously armed hypertext link 802 containing the words "Sun Microsystems". Upon receipt of the "enter" key, an exemplary embodiment selects hypertext link 802, retrieves the web page for "Sun Microsystems" and displays the information associated with the web page on display device.

If the method receives the "enter" key and no selectable element is currently armed then, at step 526, the system will generate an error message for the user. This error indicates that the user of the method has attempted to select a selectable element which has not been armed. At step 526, various embodiments can be used to indicate that a user is attempting to select a selectable element before it has been armed. In one embodiment, an audible message is provided when a user tries to select a selectable element before a selectable element has been armed. In an alternative embodiment, a visual image or message is provided to the user trying to select a selectable element before a selectable element has been armed. For example, the method may provide an audible beep the first and second time the user actuates the "enter" key without a selectable element first being armed. The third time, however, a window may appear indicating that the user has attempted to select a selectable element before an element has been armed. Those skilled in the art understand that various combinations of audio and visual messages may be provided to ensure the user realizes an error has been made.

The Match String Timer

Figure 6:
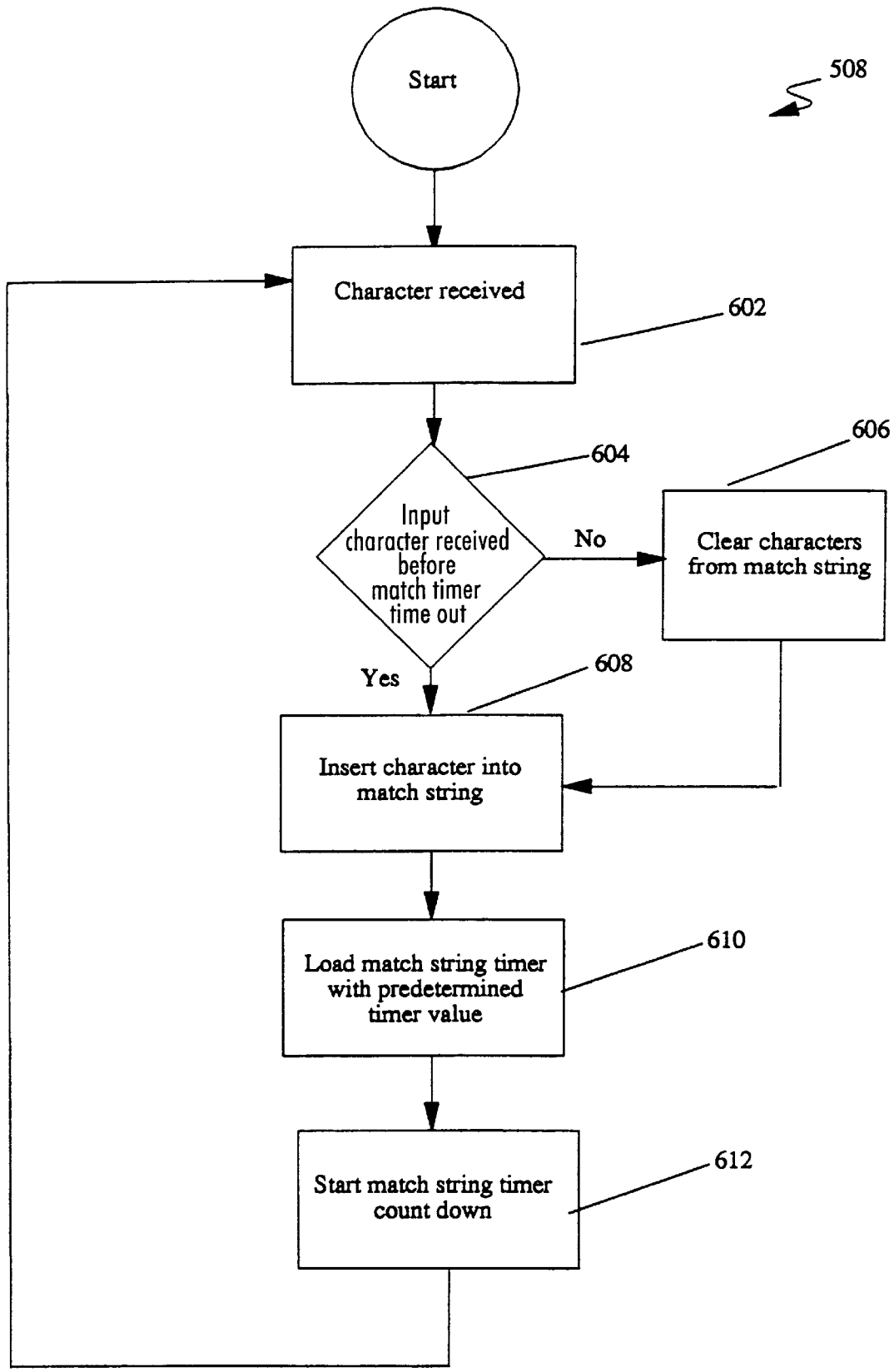
FIG. 6 is a flow diagram that illustrates the steps to process a match string timer.

In an alternative embodiment, a match string timer is used to remove characters stored in the match string at step 508. FIG. 6 is a flow diagram that illustrates the steps taken to process the match string using a match string timer. At step 602, an embodiment of the present invention receives a character from the user. At step 604, if the match string timer counts down to zero and times out the method removes all characters from the match string (step 606). However, if the match string timer has not timed out (step 604) then the method inserts the character into the match string (step 608). Each time a character is received the system loads the match string timer with another predetermined timer value (step 610). Immediately after loading the match string timer the match string timer begins a new countdown process (step 612). The match string timer ensures that a new match string is used at step 508 for comparisons when a user pauses a predetermined time interval between key strokes.

GUI Metacharacters

Figure 7:
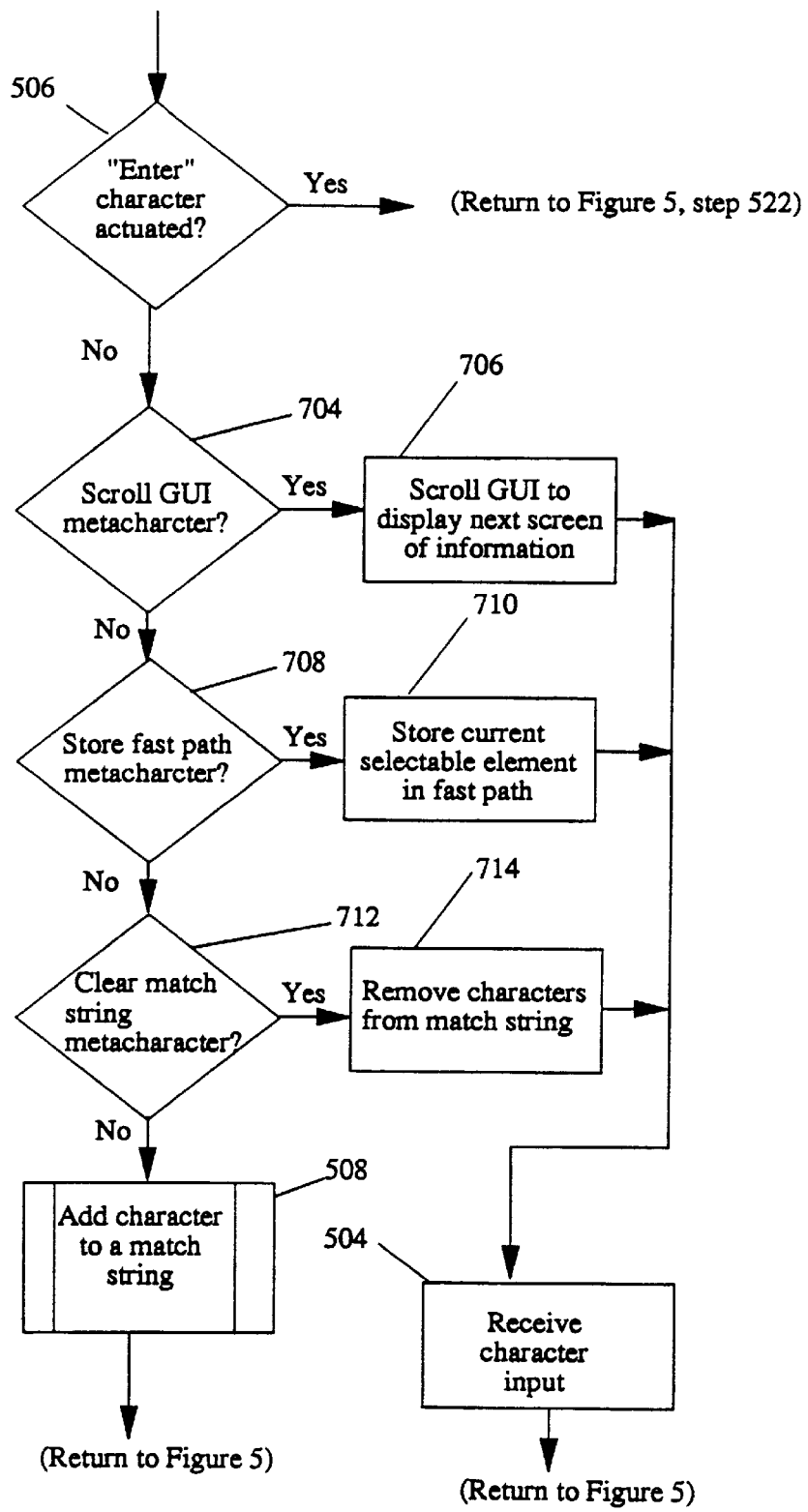
FIG. 7 is a flow diagram illustrating the steps taken to process GUI metacharacters.

In yet another alternative embodiment, the method receives a GUI metacharacter from a character based input device which controls the operation of the GUI. In one embodiment, these special keystrokes are reserved for use as GUI metacharacters and are not compared with the text of the selectable elements within the GUI. GUI metacharacters are advantageous in a mouseless environment because they provide an efficient method of controlling the GUI without a pointer device. In one embodiment, the processing of GUI metacharacters occurs after step 506 and before either step 504 or step 508. FIG. 7 illustrates the processing of these GUI metacharacters in detail.

Referring to FIG. 7, a flow diagram outlines the method in which several GUI metacharacters are processed. The method performs steps 704–718 to process GUI metacharacter. At step 704, the method determines if the user provided a screen scroll GUI metacharacter. At step 706, the method causes a screen of information on the GUI to scroll up upon receipt of an up-screen scroll character (not shown). At step 706, the method can also cause a screen of information on the GUI to scroll down upon receipt of a down-screen scroll character (not shown). In one embodiment, the method sets the current location marker to the first selectable element which appears in the screen each time the GUI window scrolls up -or down to a new set of selectable elements.

At step 708, the method determines if the user provided a fast path store keystroke. The fast path list is a collection of often used or desirable selectable elements on the GUI. The method stores the armed selectable element to be stored in a fast path list upon receipt of a fast path store keystroke character. Later, the method provides the fast path list of selectable elements to the user for additional searching. In one embodiment, the fast path list of selectable elements is displayed in a "pop-up" type window on the GUI. The user searches the fast path list by entering characters from a character based input device. In response, the method receives these characters and searches through the fast path list in a manner similar to the one described in steps 502–528.

Figure 11:
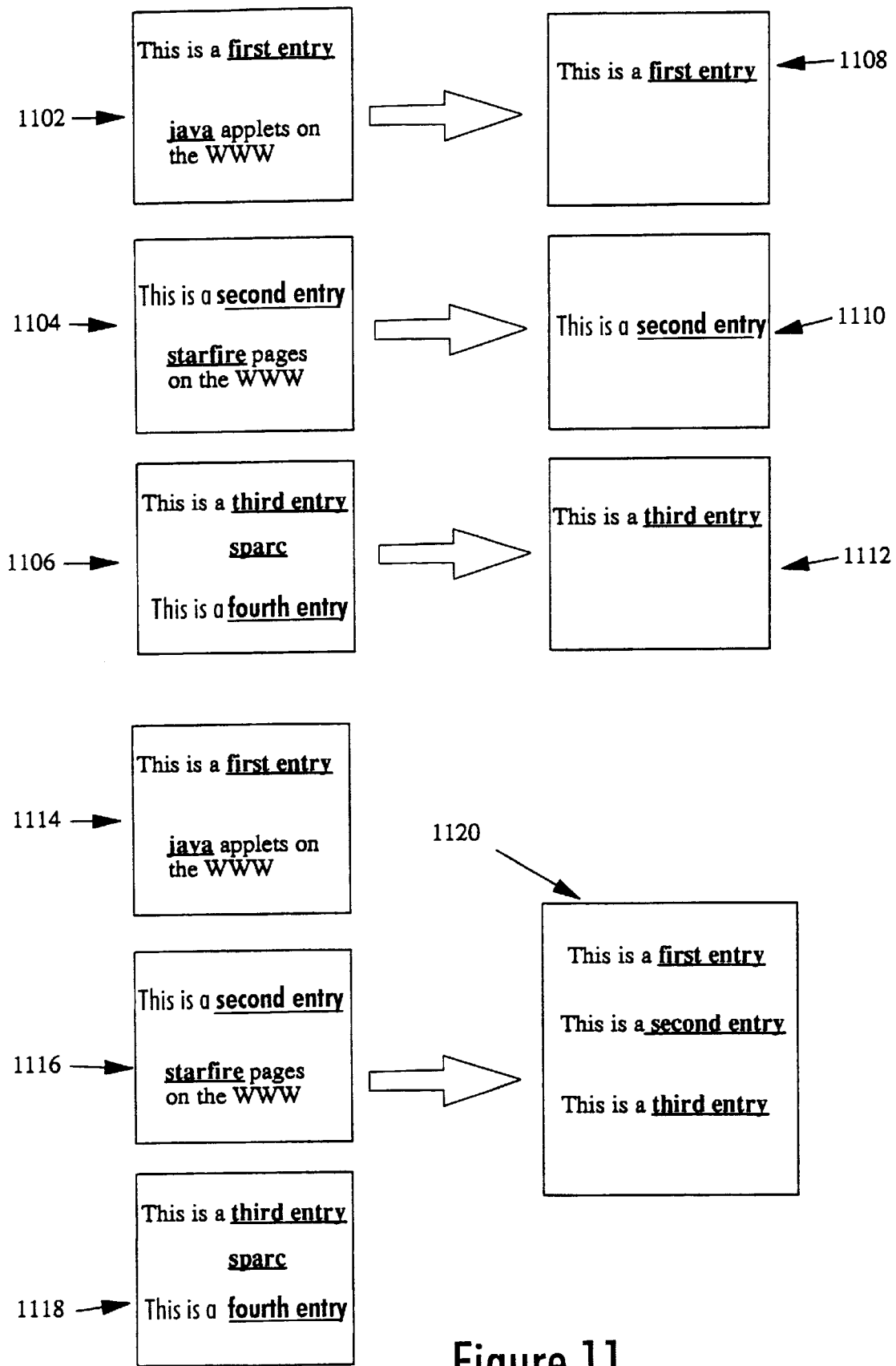
FIG. 11 illustrates various embodiments of the present invention using a fast path list for storing selectable elements in a GUI.

FIG. 11 illustrates various embodiments of fast path lists for storing selectable elements in a GUI. In one embodiment, selectable elements from GUI pages 1102, 1104, and 1106 are stored in separate fast path lists 1108, 1110, and 1112 respectively. This allows the user to segregate important hypertext links from each web page in separate lists. In yet another embodiment, selectable elements retrieved from GUI pages 1114, 1116, and 1118 are stored in a single fast path list 1120. In this case, the user can consolidate all important hypertext links in a central location for easy access. Those skilled in the art understand that the selectable elements in the fast path list may be deleted by user using techniques well known in the art. Furthermore, the Applicant contemplates that the hypertext links contained within the fast path lists in either embodiment can be sorted lexically, chronologically by topic, or even by frequency of use.

Referring back to FIG. 7, at step 712 the method may also determine if the user provided a clear match string GUI metacharacter. In response to receiving the clear match string GUI metacharacter, the method removes all characters in the match string (step 714). This enables the user to quickly remove the characters in the match string and begin searching for a new selectable element in the GUI.

In general, GUI metacharacters are designed to make searching and selecting a selectable element without a pointing device a more efficient process. In one embodiment, if a combination of GUI metacharacters arms a selectable element, the current location marker is advanced to the next subsequent selectable element. This enables the user to advance the current location marker using one or more GUI metacharacters and then begin searching subsequent to the current location marker's new location. For example, a user enters several "tab" keystrokes to advance to a particular hypertext link on a web page. In one embodiment, the particular hypertext link is armed and the current location marker is advanced to the next subsequent hypertext link. In an alternative embodiment, if the current location marker is not advanced, subsequent searches begin from the current location marker's original location.

Those of ordinary skill will understand that many other GUI metacharacters could be provided by embodiments of the present invention to control the operation of the GUI. The exemplary uses of GUI metacharacters above are provided as examples and should not limit the scope of the present invention.

Using the methods illustrated in FIGS. 5–11 enables a user to select selectable elements in a graphical user interface without the use of a mouse or pointing device. These methods are particularly useful for searching and selecting hypertext links from a large hypertext system containing lexically unordered data. The teachings and suggestions of the present invention allow a user to quickly navigate to an appropriate hypertext link by entering characters associated with the appropriate hypertext link.

Embodiments of present invention provide a number of advantages over the methods used in the prior art. For example, embodiments of the present invention do not interfere with the layout and placement of selectable elements in a GUI. In the prior art, some methods required the addition of numeric text to each selectable element. These additions destroyed the original layout intended by the original hypertext designers and were visually unappealing. Embodiments of the present invention require no additional text or modification for the hypertext selection to work.

In addition, embodiments of the present invention require less keystrokes to search for a particular selectable element in a GUI based system than the prior art. Some prior art systems required a user to page through each selectable element one element at a time using an up or down keystroke on the keyboard. Getting to the last selectable element in a list required scrolling through each element. In contrast, embodiments of the present invention allow one to quickly search for the proper selectable element by entering only a few keystrokes. The user is quickly taken to the selectable element which matches the characters entered by the user. This is particularly useful in searching for hypertext links on the World Wide Web where there are many hypertext links which do not appear in alphabetical, chronological or numeric order.

While specific embodiments have been described herein for purposes of illustration, various modifications may be made without departing from the spirit and scope of the invention. Various embodiments of the present invention can be implemented on the World Wide Web (WWW) or any other GUI based system which utilizes similar selectable elements. These various embodiments are particularly useful on GUI based systems where the selectable elements are lexically unordered and too numerous to simultaneously display on a single display screen. Accordingly, the invention is not limited to the above described embodiments, but instead is defined by the appended claims in light of their full scope of equivalents.

What is claimed is:

1. A method for facilitating the selection of at least one selectable element from a multiplicity of lexically unordered selectable elements on a graphical user interface (GUI) having a plurality of elements, at least one of the multiplicity of selectable elements having a character portion, said method comprising the computer implemented steps of:

receiving one or more characters from a character based input keyboard device;

comparing said one or more characters received from said character based input keyboard device with said character portion from one or more of said multiplicity of lexically unordered selectable elements; and matching said one or more characters received from said character based input keyboard device with said character portion of at least one selectable element within said multiplicity of lexically unordered selectable elements.

2. The method of claim 1 further comprising the step of:

arming a selectable element which matched said one or more characters received from said character based input keyboard device.

3. The method in claim 2 wherein said arming step further comprises the step of disarming a previously armed selectable element before arming said selectable element which matched said one or more characters received from said character based input keyboard device.

4. The method of claim 2 further comprising the step of:

selecting said armed selectable element in response to receiving an actuation input signal which indicates said armed selectable element should be selected.

5. The method of claim 1 further comprising the step of:

setting a current location marker to a predetermined selectable element in said multiplicity of lexically unordered selectable elements, wherein said current location marker indicates which selectable element the comparing step should begin comparisons with.

6. The method in claim 5 wherein said predetermined selectable element is said first selectable element in said multiplicity of lexically unordered selectable elements.

7. The method in claim 5 further comprising the step of advancing said current location marker to said selectable element immediately subsequent to a selectable element which matches said one or more characters received from said character based input keyboard device.

8. The method of claim 1 further comprising the step of receiving a GUI metacharacter from said character based input keyboard device, wherein said GUI metacharacter controls a predetermined function of the GUI.

9. The method in claim 8 further comprising the steps of:

receiving a fast path store GUI metacharacter from said character based input keyboard device; and in response to receiving said fast path store GUI metacharacter, storing an armed selectable element in a fast path selection list, wherein said selectable element is stored within said fast path selection list for rapid selection at a subsequent time period.

10. The method in claim 1 wherein the selectable elements are hypertext links.

11. The method in claim 1 wherein the selectable elements are GUI buttons.

12. An apparatus for facilitating the use of a character input keyboard device in the selection of at least one selectable element from a multiplicity of lexically unordered selectable elements on a graphical user interface (GUI) program having a plurality of elements, at least one of said multiplicity of selectable elements having a character portion, said GUI executing on a computer system including a processor, a memory, a display device displaying the graphical user interface (GUI) the character input keyboard device, a storage device, and a mechanism for communicating between the processor, the character input keyboard device and the memory, the memory including the graphical user interface (GUI) program and a runtime system, said apparatus comprising:

a receiver module configured to receive one or more characters from a character based input keyboard device;

a comparison module configured to compare one or more characters received from the character based input keyboard device with said character portion from one or more of said multiplicity of lexically unordered selectable elements; and a match module configured to match said one or more characters received from said character based input keyboard device with said character portion of at least once selectable element within said multiplicity of lexically unordered selectable elements.

13. The apparatus of claim 12 further comprising:

an arming module configured to arm a selectable element which matched said one or more characters received from said character based input keyboard device; and a selection module configured to select said armed selectable element in response to receiving an actuation input signal.

14. The apparatus in claim 13 further comprising a current location marker set to a predetermined selectable element in said multiplicity of lexically unordered selectable elements, wherein said current location indicate which selected element said comparison module should begin comparisons with.

15. The apparatus in claim 14 where said current location marker is advanced to said selectable element subsequent to said selectable element which matches said one or more characters received from said character based input keyboard device.

16. The apparatus in claim 12 wherein the selectable elements are hypertext links.

17. The apparatus in claim 12 wherein the selectable elements are GUI buttons.

18. The apparatus in claim 12 further comprising a receiver module for receiving one or more GUI metacharacters from a character based input keyboard device, wherein a GUI metacharacter controls a predetermined function of the GUI.

19. The apparatus in claim 12 wherein said computer system is a client computer coupled to one or more server computer systems over a communications link and wherein data is exchanged between said client computer system and at least one server computer system over said communications link.

20. The apparatus in claim 12 wherein said computer system is a server computer coupled to one or more client computer systems over a communications link and wherein data is exchanged between said server computer system and at least one client computer system over said communications link.

21. A program storage device readable by a machine, tangibly embodying a program of instructions executable by the machine for facilitating the selection of at least one selectable element from a multiplicity of lexically unordered selectable elements on a graphical user interface (GUI), at least one selectable element within said multiplicity of lexically unordered selectable elements having a character portion, said program comprising:

code that receives one or more characters from a character input keyboard device;

code that compares one or more characters received from said character input keyboard device with said character portion from one or more of said multiplicity of lexically unordered selectable elements; and code that matches said one or more characters received from said character based input keyboard device with at least one selectable element within said multiplicity of lexically unordered selectable elements.

22. The storage device of claim 21 further comprising:

code that arms a selectable element which matched said one or more characters received from said character based input keyboard device.

23. The storage device of claim 22 further comprising:

code that selects the armed selectable element in response to receiving an actuation input signal.

24. The storage device in claim 21 wherein the selectable elements are hypertext links.

25. The storage device in claim 21 wherein the selectable elements are GUI buttons.

26. The storage device in claim 22 further comprising code capable of receiving one or more GUI metacharacters from a character based input keyboard device, wherein said GUI metacharacter controls a predetermined function of the GUI.

* * * * *

UNITED STATES PATENT AND TRADEMARK OFFICE
CERTIFICATE OF CORRECTION

PATENT NO. : 5,963,950
DATED : Oct. 5, 1999
INVENTOR(S) : Nielsen et al.

It is certified that error appears in the above-identified patent and that said Letters Patent is hereby corrected as shown below:

In the Claims, in Claim 14, line 4, after "location" insert word --marker--, further in the same line change "indicate" to --indicates-- and after word "which" change "selected" to --selectable--.

Signed and Sealed this

Twenty-fifth Day of April, 2000

Attest:

Q. TODD DICKINSON

*Attesting Officer*  *Director of Patents and Trademarks*